Sept. 25, 1945.  A. O. DADY  2,385,350
ROLLER LATCH CONSTRUCTION
Filed March 26, 1942
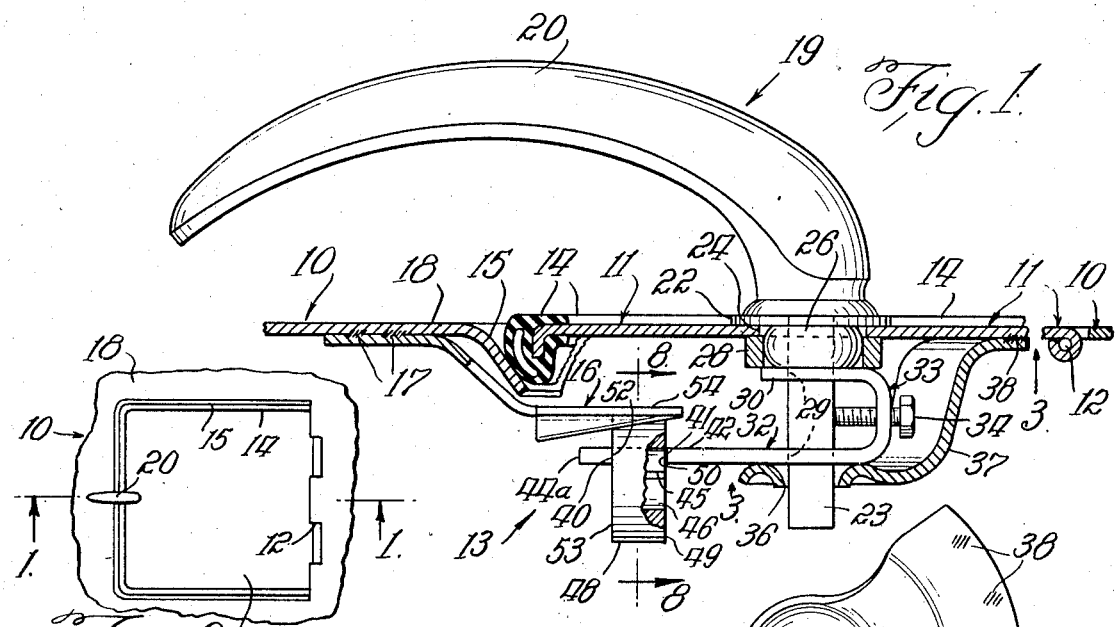
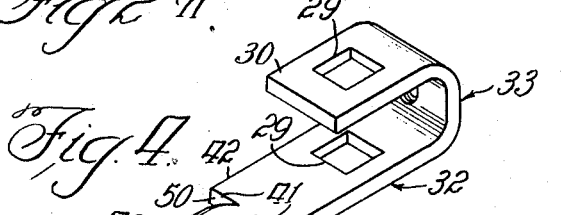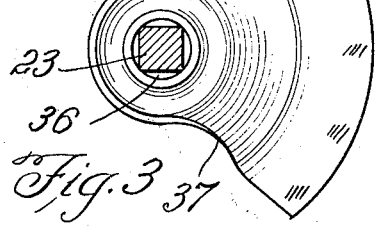
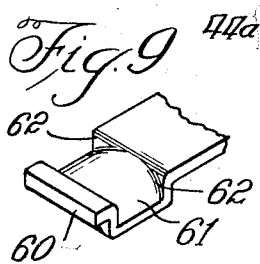
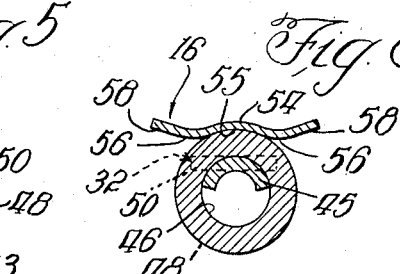
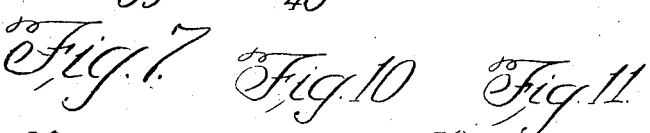
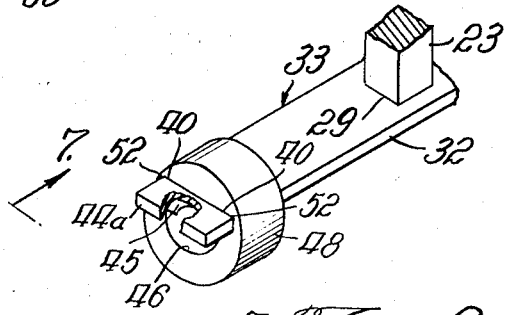
Inventor
Arthur O. Dady
By Frank H. Marks
Atty.

Patented Sept. 25, 1945

2,385,350

UNITED STATES PATENT OFFICE 2,385,350

ROLLER LATCH CONSTRUCTION

Arthur O. Dady, Flossmoor, Ill., assignor to Sears, Roebuck and Co., Chicago, Ill., a corporation of New York Application March 26, 1942, Serial No. 436,357

7 Claims. (Cl. 292—239)

This invention relates to latch mechanism.

It is an object of my invention to provide a latch of simplified construction.

Another object is to provide a novel antirattling latch construction which is easy to operate and readily releasable yet will not become accidentally released.

A further object is to provide a novel roller latch construction.

It is another object to provide a novel roller support for a roller latch device.

It is a further object to provide a novel self-cleaning bearing for a latch roller.

Further objects and advantages of the invention will be apparent as the description proceeds.

The invention will be better understood upon reference to the following description and the accompanying drawing, in which:

Fig. 1 is a fragmentary section-elevation of an illustrative form of my invention taken as indicated by the line 1—1 in Fig. 2.

Fig. 2 is a fragmentary plan view of Fig. 1.

Fig. 3 is a sectional view taken as indicated by the line 3—3 in Fig. 1.

Fig. 4 is a perspective view of the roller bearing and support shown in Fig. 1, in the shape in which it is formed for reception of the roller, and before receiving its final shape.

Fig. 5 shows the left-hand portion of the member of Fig. 4, but in its final form.

Fig. 6 is a fragmentary perspective view showing the roller assembled on its support, after the latter has been given its final shape.

Fig. 7 is a fragmentary end elevation, taken as indicated by the line 7—7 in Fig. 6.

Fig. 8 is a sectional view taken as indicated by the line 8—8 in Fig. 1.

Fig. 9, Figs. 10 and 11 show modified forms of bearing and retainer construction.

Referring now more particularly to the drawing, there is shown at 10 any suitable container or enclosure, which could be a coal hopper, equipped with a door 11 hinged thereto as at 12 and provided with an illustrative form of my novel latch mechanism indicated generally at 13.

The door preferably carries a rubber or other suitable gasket 14 for dust-proof engagement with a corresponding lip 15 at the rim of the door 11. The latch mechanism may comprise a relatively stationary striker 16 welded as at 17, or otherwise suitably mounted on the chamber or compartment 10 adjacent the free end of the door. The latch structure carried by the door for cooperation with the striker 16 is indicated generally at 19 and may comprise a handle 20 engaging a washer or escutcheon 22 adapted to rest on the door 11, and a square or other preferably non-circular stem 23 passing through an opening 24 in the door, a loose collar 26 preferably non-rotatably associated with said stem, a spacer 28 engaged with the inner side of the door and embracing said collar, and the correspondingly shaped holes 29 of the arms 30 and 32 of a U-shaped element 33 retained in engagement with the stem 23 by any suitable means, as a set screw 34, which also serves thereby to retain the handle and associated mechanism in assembly with the door, and a bearing opening 36 in a bracket 37 welded as at 38 or otherwise suitably mounted on the door. The opening 36 is of a size to permit relative rotation of the stem. The escutcheon 22, collar 26 and spacer ring 28 enable the handle to be suitably mounted notwithstanding manufacturing variations in the size of the opening 24 in the door 11.

The U-shaped element 33 may be formed of strap metal or other suitable stock. Two pairs of transverse alined slits 40 and 41 are formed in opposite margins of the free end portion 42 of the arm 32, forming an end section 44 and an inner section 45 connected by a neck portion 45a. Said sections are thereupon bent arcuately in the same direction as shown in Fig. 4, so that the convex surface of the section 44 does not project outwardly beyond the convex surface of the section 45. The curvature and width of the section 45 are selected so that its outer surface will have a bearing fit in the bore 46 of a latch roller 48, which is thereupon slipped freely over the section 44 and onto the section 45 until a face 49 of the roller is in substantial abutment with the shoulders 50 formed on the arm 32 when the section 45 is bent. Then one or both of the wings of the section 44 are bent back until the section is substantially straighter, as shown at 44a, providing shoulders 52 in substantial engagement with the other face 53 of the roller, thereby positively locking the roller on the strap 33. Sufficient clearance is provided between the roller and the respective shoulders 50 and 52 to preclude said shoulders from interfering with rotation of the roller, the shoulders being however sufficiently close to the roller to act as wipers to clean the ends of the roller.

The handle and associated parts may be readily assembled with the door, by placing the spacer 28 and strap 33 in the positions shown, but with the screw backed up and its head clear of the bracket 37 so that the screw may be manipulated, slipping the stem 23 through the collar, strap and bracket 37 and tightening the screw. The parts may be disassembled by reversing this procedure.

The striker 16 is preferably of a generally undulating form in transverse section, simulating a flat W, as shown in Fig. 8, and preferably extends as a cantilever so as to have resilience, the striker being arranged so that its free end portion 54 cooperates with the roller 48. The striker accordingly has a central recess or socket 55 arranged to receive and engage the roller with resilient pressure, the recess terminating laterally in humps or obstructions 56 having outer approaches such as cam portions or ramps 58 to allow easy engagement. The roller rolls or rides transversely of the striker against spring pressure to cam the humps aside so that the roller may enter or leave the recess 55, as the handle 20 is swung toward or away from a plane represented by the plane of the drawing.

The bearing section 45 may be semi-cylindrical or more or less so, the edges at the ends of the arc serving to wipe the bore 46 of the roller while the shoulders 50 and 52 wipe the faces of the roller. The shoulders 50 and 52 are formed on portions having a greater extent than the diameter of the bore 46 so that in no event can the roller become separated from the strap 33 or displaced longitudinally from the relation shown.

The handle 20 is made sufficiently long to enable the user with relatively light exertion to overcome the spring pressure of the striker for latching and unlatching the roller, the pressure being such however as to firmly maintain the roller in the recess 55 against accidental displacement. The collar 26 may be part spherical exteriorly to insure proper fit in the opening 24. The spring pressure automatically moves the roller into or out of the recess 55 when the roller passes dead center on either hump 56 toward or away from the recess, as the case may be, so that the user is informed of the latching condition by his sense of touch on the handle, and said pressure also maintains the door tightly closed and dust-proof. The strap arm 32 could be resiliently yieldable for the same purpose. Suitable indicia (not shown) on the body 10 on the door 11 or on both body and door in association with the free end or other part of the handle could be employed to show by the position of the handle whether the door is latched or unlatched. If desired, the arrangement could be reversed with the handle on the compartment 10 and the cooperating structure on the door 11.

If desired, a single ramp 58 could be provided on the striker, the latter or the bracket 37 or other suitable part being provided with a suitable abutment to engage the roller or bearing strap therefor to stop the roller from passing beyond the recess 55 when the roller is moved to latch the same.

Instead of slitting the arm 32, said arm could be deformed as shown in Fig. 9, providing an elongated substantially semi-cylindrical portion which can pass through a bearing roller 48, and then upsetting the free end of such elongated portion as at 60, the remaining curved portion 61 serving as the bearing. The shouldered portion 62 could be formed as in Fig. 9 or by slitting as at 50 in Figs. 4, 5 and 6. Or the bearing member may be initially cylindrical or polygonal or otherwise shaped with its surface providing a bearing for the roller, the member being upset at the faces of the roller. An example of the latter constructions is shown in Figs. 10 and 11, wherein the edges 64 of a polygonal arm 65 form a bearing for a roller 48, and the arm is upset as at 66 to lock the roller to the arm, clearance being afforded to permit rotation of the roller.

Various modifications may suggest themselves to those skilled in the art without departing from the spirit of my invention and, hence, I do not wish to be restricted to the specific form shown or uses mentioned.

I claim:

1. In a latch construction, means for cooperating with a striker, said means comprising a member having an arcuate intermediate portion, and a roller having a bore slidably rotatably fitted on said arcuate portion, said member having integral portions at the opposite ends of said arcuate portion and substantially engaging the ends of said roller.

2. In a latch construction, means for cooperating with a striker, said means comprising a strap member having an arcuate intermediate roller bearing portion and portions extending outwardly beyond the outer periphery of said bearing portion at the ends of said bearing portion to retain a roller mounted on said bearing portion.

3. A latch roller support comprising a strap having two opposite pairs of slits defining wings at the longitudinal edges of said strap, said wings and the intermediate portion of said strap extending in a continuous at least part-cylindrical form for sliding bearing engagement in the bore of a roller.

4. A latch roller support comprising a strap having a free end and an intermediate bearing portion for sliding bearing engagement in the bore of a roller, said strap affording an abutment at one end of said portion for receiving the thrust of one end of the roller, the free end of said strap being disposed substantially within the cylindrical envelope of said bearing portion to permit the roller to slip thereover and onto said bearing portion and being bendable to a position to receive the thrust of the other end of the roller.

5. A latch roller support comprising a strap having a free end and an intermediate bearing portion for sliding bearing engagement in the bore of a roller, said strap affording an abutment at one end of said portion for receiving the thrust of one end of the roller, the free end of said strap being disposed substantially within the cylindrical envelope of said bearing portion to permit the roller to slip thereover and onto said bearing portion and being bendable to a position to receive the thrust of the other end of the roller, said strap being slit at the outer end of said bearing portion to facilitate bending of said free end.

6. A latch roller support comprising a member having slits defining opposite wings offset from the portions of said member at opposite sides of said wings and extending arcuately to provide a bearing, and a roller mounted on said bearing, said portions of said member being in substantially wiping engagement with the opposite faces of said roller and retaining said roller therebetween.

7. A latch roller support comprising a strap having a portion curved to the shape of at least a part of a cylinder and, adjacent said portion, having a shoulder projecting outwardly beyond the envelope of said portion, said portion having slits transverse to its axis and spaced from said shoulder, the material of said portion between said slits and the free end of said portion being bendable to project outwardly of said envelope, said shoulder, and said material when so bent, projecting outwardly of said envelope to such an extent as to retain a roller having bearing engagement with the intervening part of said portion.

ARTHUR O. DADY.